US012333750B2

(12) United States Patent
Guizilini et al.

(10) Patent No.: US 12,333,750 B2
(45) Date of Patent: *Jun. 17, 2025

(54) SYSTEMS AND METHODS FOR GENERIC VISUAL ODOMETRY USING LEARNED FEATURES VIA NEURAL CAMERA MODELS

(71) Applicant: TOYOTA RESEARCH INSTITUTE, INC., Los Altos, CA (US)

(72) Inventors: Vitor Guizilini, Santa Clara, CA (US); Igor Vasiljevic, Los Altos, CA (US); Rares A. Ambrus, San Francisco, CA (US); Sudeep Pillai, Los Altos, CA (US); Adrien Gaidon, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/722,360

(22) Filed: Apr. 17, 2022

(65) Prior Publication Data
US 2022/0245843 A1  Aug. 4, 2022

Related U.S. Application Data

(63) Continuation of application No. 17/021,968, filed on Sep. 15, 2020, now Pat. No. 11,508,080.

(51) Int. Cl.
*G06T 7/55* (2017.01)
*G05D 1/00* (2024.01)
(Continued)

(52) U.S. Cl.
CPC .................. *G06T 7/55* (2017.01); *G06T 3/18* (2024.01); *G06T 7/33* (2017.01); *G06T 7/80* (2017.01);
(Continued)

(58) Field of Classification Search
CPC ........... G06T 7/55; G06T 7/80; G06T 3/0093; G06T 7/33; G06T 2207/20081;
(Continued)

(56) References Cited

U.S. PATENT DOCUMENTS 10,600,210 B1 *  3/2020  Citraro .................. G06V 20/42
11,521,373 B1 * 12/2022  Akbas .................. A61B 5/7267
(Continued)

FOREIGN PATENT DOCUMENTS

AU      2017209231 A1 * 11/2017   ......... G06K 9/00664
DE      102016123149 A1 *  5/2018
(Continued)

OTHER PUBLICATIONS

D. Nister, O. Naroditsky and J. Bergen, "Visual odometry," Proceedings of the 2004 IEEE Computer Society Conference on Computer Vision and Pattern Recognition, 2004. CVPR 2004., Washington, DC, USA, 2004, pp. I-I, doi: 10.1109/CVPR.2004.1315094. (Year: 2004).*

(Continued)

*Primary Examiner* — Charles T Shedrick
(74) *Attorney, Agent, or Firm* — SHEPPARD, MULLIN, RICHTER & HAMPTON LLP; Daniel N. Yannuzi

(57) ABSTRACT

Systems and methods for self-supervised learning for visual odometry using camera images, may include: estimating correspondences between keypoints of a target camera image and keypoints of a context camera image; based on the keypoint correspondences, lifting a set of 2D keypoints to 3D, using a neural camera model; and projecting the 3D keypoints into the context camera image using the neural camera model. Some embodiments may use the neural camera model to achieve the lifting and projecting of keypoints without a known or calibrated camera model.

7 Claims, 9 Drawing Sheets

(51) Int. Cl.
*G06T 3/18* (2024.01)
*G06T 7/33* (2017.01)
*G06T 7/80* (2017.01)

(52) U.S. Cl.
CPC ......... *G05D 1/0088* (2013.01); *G05D 1/0214* (2013.01); *G05D 1/0223* (2013.01); *G05D 1/0251* (2013.01); *G06T 2207/20081* (2013.01); *G06T 2207/30244* (2013.01); *G06T 2207/30252* (2013.01)

(58) Field of Classification Search
CPC ........... G06T 2207/30252; G06T 2207/30244; G05D 1/0223; G05D 1/0214; G05D 1/0088; G05D 2201/0213; G05D 1/0251
See application file for complete search history.

(56) References Cited

U.S. PATENT DOCUMENTS

| | | | | |
|---|---|---|---|---|
| 11,688,139 | B1* | 6/2023 | Karagoz | G09B 19/0038 345/419 |
| 2012/0300020 | A1* | 11/2012 | Arth | G06T 7/75 348/E7.001 |
| 2015/0287211 | A1* | 10/2015 | Mundhenk | G06T 7/143 382/173 |
| 2015/0325003 | A1* | 11/2015 | Cleveland | G06T 7/246 382/103 |
| 2016/0267678 | A1* | 9/2016 | Cleveland | G06T 7/246 |
| 2016/0335519 | A1* | 11/2016 | Wagner | G06T 7/20 |
| 2017/0161901 | A1* | 6/2017 | Cansizoglu | H04N 13/207 |
| 2018/0139431 | A1* | 5/2018 | Simek | H04N 13/271 |
| 2019/0279383 | A1* | 9/2019 | Angelova | G06N 3/044 |
| 2020/0098135 | A1* | 3/2020 | Ganjineh | G06V 20/588 |
| 2021/0315485 | A1* | 10/2021 | Matusik | A61B 5/6807 |
| 2021/0326601 | A1* | 10/2021 | Tang | G06T 7/74 |
| 2022/0028110 | A1* | 1/2022 | Detone | G02B 27/0172 |

FOREIGN PATENT DOCUMENTS

| | | | | | |
|---|---|---|---|---|---|
| EP | | 3770811 | A1* | 1/2021 | ......... G06K 9/00718 |
| WO | WO-2008143523 | A1* | 11/2008 | ............. G06T 7/251 |
| WO | WO-2012091814 | A2* | 7/2012 | ............ B25J 11/009 |
| WO | WO-2015035462 | A1* | 3/2015 | ........... G06T 7/0028 |
| WO | WO-2015113608 | A1* | 8/2015 | ........... G06F 16/583 |

OTHER PUBLICATIONS

Anantrasirichai et al., "Fast Depth Estimation for View Synthesis," 28th European Signal Processing Conference (EUSIPCO 2020), Jan. 22, 2021, pp. 575-579 (https://www.eurasip.org/Proceedings/Eusipco/Eusipco2020/pdfs/0000575.pdf).

Mayer et al., "A Large Dataset to Train Convolutional Networks for Disparity, Optical Flow, and Scene Flow Estimation," 2016 IEEE Conference on Computer Vision and Pattern Recognition (CVPR), Jun. 2016, pp. 4040-4048 (https://doi.org/10.1109/CVPR.2016.438).

Iida et al., "High-accuracy Range Image Generation by Fusing Binocular and Motion Stereo Using Fisheye Stereo Camera," 2020 IEEE/SICE International Symposium on System Integration (SII), Jan. 2020, pp. 343-348 (https://doi.org/10.1109/SII46433.2020.9025910).

Chen et al., "Efficient Neural Processor for Camera Distortion Correction," Applied Mechanics and Materials, vols. 764-765, May 2015, pp. 1234-1239 (https://doi.org/10.4028/www.scientific.net/AMM.764-765.1234).

Tsai et al., "Two View to N-view Conversion without Depth," 2011 Visual Communications and Image Processing (VCIP), Nov. 2011, 4 pages (https://doi.org/10.1109/VCIP.2011.6115974).

* cited by examiner

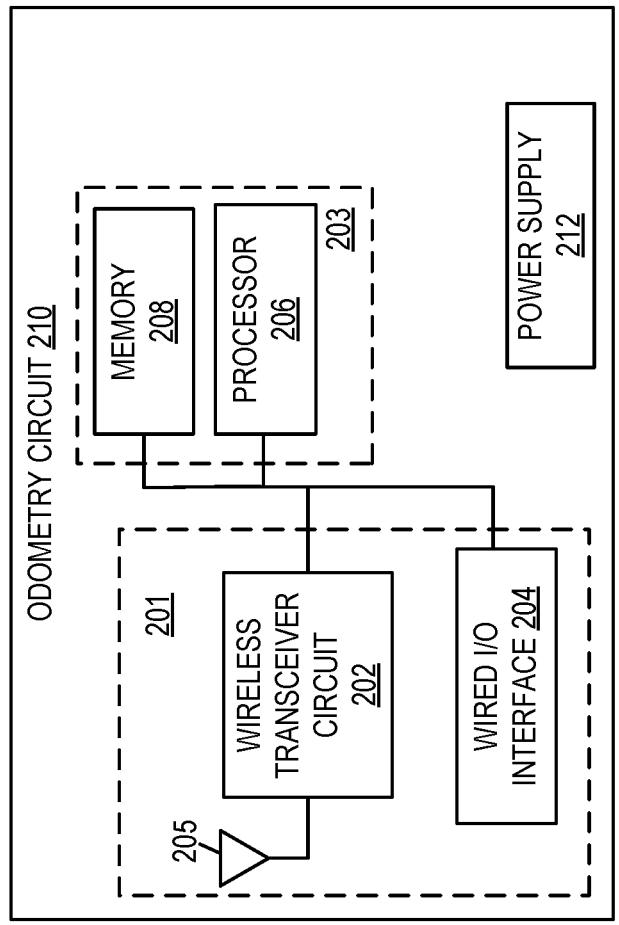
Fig. 2

SYSTEMS AND METHODS FOR GENERIC VISUAL ODOMETRY USING LEARNED FEATURES VIA NEURAL CAMERA MODELS

CROSS-REFERENCE TO RELATED APPLICATIONS

This application is a continuation of and claims the benefit of U.S. patent application Ser. No. 17/021,968 filed Sep. 15, 2020, which is hereby incorporated herein by reference in its entirety for all purposes.

TECHNICAL FIELD

The present disclosure relates generally to visual odometry, and in particular, some implementations may relate to systems and methods for performing visual odometry using learned features.

DESCRIPTION OF RELATED ART

Autonomous vehicle technology is becoming more commonplace with the introduction of new vehicles each model year. While widespread adoption of fully autonomous vehicles is only now becoming visible on the horizon, autonomous vehicle technology is gaining increasing popularity for assisted driving and other semi-autonomous vehicle operation. Developers within organizations such as major original equipment manufacturers, tier 1 suppliers, startup companies and others, are racing to develop autonomous vehicle and advanced driver assistance systems (ADAS) technologies. Such technologies are not limited to autonomous vehicles, but can also be used in robotics and other like applications.

Various devices that operate autonomously or that provide information about a surrounding environment use sensors that facilitate perceiving obstacles and additional aspects of the surrounding environment. For example, a robotic device may use information from the sensors to develop awareness of the surrounding environment in order to navigate through the environment and avoid hazards. In particular, the robotic device may use the perceived information to determine a 3-D structure of the environment in order to identify navigable regions. The ability to perceive distances through estimation of depth using sensor data may provide the robotic device with the ability to plan movements through the environment and generally improve situational awareness about the environment. However, depending on the available onboard sensors, the robotic device may acquire a limited perspective of the environment, and, thus, can encounter difficulties in distinguishing aspects of the environment.

In robotics and 3D computer vision, a camera model that relates image pixels and 3D world points is a prerequisite for many tasks, including visual odometry, depth estimation, and 3D object detection. The perspective pinhole camera model is ubiquitous due to its simplicity. Recently, deep neural architectures that rely on the pinhole assumption with geometric constraints have led to major advances in tasks such as monocular 3D detection and depth estimation. These networks are generally trained on curated and rectified image datasets where the pinhole assumption is appropriate.

However, there are a variety of settings where this assumption does not hold, such as fisheye and catadioptric lenses as well as physical arrangements that break the pinhole assumption (e.g., a dashboard camera behind a windshield, or a system of multiple cameras).

The pinhole model allows for closed form lifting and projection operations, and thus can be used as a module in deep architectures, either fixed and precomputed or learned. Parametric distortion models, as well as models for more complex lens designs (e.g., fisheye cameras), are generally significantly more complex and more difficult to calibrate. Adapting these models to learn depth and ego-motion can have his challenges because distortion models are generally a simplification of complex lens distortion, and new differentiable projection models typically need to be individually created for each type of camera. The resulting architecture is then specialized to a single camera model, and must often be significantly modified before it can be used to train on a new dataset from a novel camera.

That is, various sensors perceive different aspects of the environment differently and also have different implementation characteristics. For example, LiDAR is effective at perceiving depth in the surrounding environment but suffers from difficulties such as high costs and can encounter errors in certain weather conditions. Moreover, other sensors, such as stereo cameras, function to capture depth information but also suffer from difficulties with cost, limited field of view, and so on. Additionally, while monocular cameras can be a cost-effective approach, the sensor data from such cameras does not explicitly include depth information. Instead, the robotic device implements processing routines that derive depth information from the monocular images.

However, leveraging monocular images to perceive depth can also suffer from difficulties such as limited resolution, image artifacts, difficulties with training the processing routines (e.g., expensive or limited availability of data), and so on. As such, many difficulties associated with determining depth data persist that may result in reduced situational awareness for a device, and, thus, difficulties in navigating or performing other associated functions.

BRIEF SUMMARY OF THE DISCLOSURE

Various embodiments of the disclosed technology relate to improved methods for performing odometry for ego vehicle motion or other robotic motion. Embodiments may be implemented that take key points of multiple images in the form of two-dimensional (2D) pixels and lift pixels into three-dimensional (3D) data and project them back to 2D. Based on the 3D to 2D correspondences, systems and methods calculate displacement. A neural camera model can be used to perform keypoint liftings and projections without requiring knowledge of the camera model. Accordingly, embodiments can combine visual odometry using key points with a neural camera model to learn key points without knowing the camera model. This may provide an improvement over conventional solutions that require knowledge of camera parameters to lift 2D data points to 3D and project them to 2D.

In various embodiments, a method of self-supervised learning for visual odometry using camera images captured on a camera may include: using a key point network to learn a keypoint matrix for a target image and a context image captured by the camera; using the learned descriptors to estimate correspondences between the target image and the context image; based on the keypoint correspondences, lifting a set of 2D keypoints to 3D, using a learned neural camera model; estimating a transformation between the target image and the context image using 3D-2D keypoint correspondences; and projecting the 3D keypoints into the context image using the learned neural camera model. The method may further include estimating a transformation between two images using 3D-2D keypoint matching.

In various embodiments, the 3D-2D keypoint correspondences used to estimate the transformation between the target image and the context image may include a set of lifted keypoints and their corresponding set of 2D keypoints.

Lifting to 3D and projection to 2D achieved through the neural camera model may be performed without a known or calibrated camera model for the camera.

The neural camera model may be configured to learn a pixel-wise ray surface that enables learning depth and pose estimates in a self-supervised way from a wider variety of camera geometries.

The method may further include the neural camera model using depth decoding to predict a depth map and a ray surface decoder to predict a ray surface from the target image.

The keypoint matrices each may include key points, descriptors and scores for their respective images.

Using the learned descriptors to estimate correspondences between the target image and the context image may include computing a set of corresponding keypoints comprising keypoint from the target image and a warped corresponding keypoint in the context image Ic.

Using the learned descriptors to estimate correspondences between the target image and the context image may include self-supervised 3D keypoint learning.

In further embodiments, a system for self-supervised learning for visual odometry using camera images captured on a camera, the system may include: a non-transitory memory configured to store instructions; a processor configured to execute the instructions to perform the operations of: using a key point network to learn a keypoint matrix for a target image and a context image captured by the camera; using the learned descriptors to estimate correspondences between the target image and the context image; based on the keypoint correspondences, lifting a set of 2D keypoints to 3D, using a learned neural camera model; estimating a transformation between the target image and the context image using 3D-2D keypoint correspondences; and projecting the 3D keypoints into the context image using the learned neural camera model.

The operations further may include estimating a transformation between two images using 3D-2D keypoint matching.

The 3D-2D keypoint correspondences used to estimate the transformation between the target image and the context image may include a set of lifted keypoints and their corresponding set of 2D keypoints.

In various embodiments, lifting to 3D and projection to 2D achieved through the neural camera model may be performed without a known or calibrated camera model for the camera.

The neural camera model may be configured to learn a pixel-wise ray surface that enables learning depth and pose estimates in a self-supervised way from a wider variety of camera geometries.

The operations further may include the neural camera model using depth decoding to predict a depth map and a ray surface decoder to predict a ray surface from the target image.

The keypoint matrices each may include key points, descriptors and scores for their respective images.

Using the learned descriptors to estimate correspondences between the target image and the context image may include computing a set of corresponding keypoints comprising keypoint from the target image and a warped corresponding keypoint in the context image $I_c$.

Using the learned descriptors to estimate correspondences between the target image and the context image may include self-supervised 3D keypoint learning.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 is a diagram illustrating an example system for performing generic visual odometry using learned features via neural camera models in accordance with various embodiments.

Figure 1:
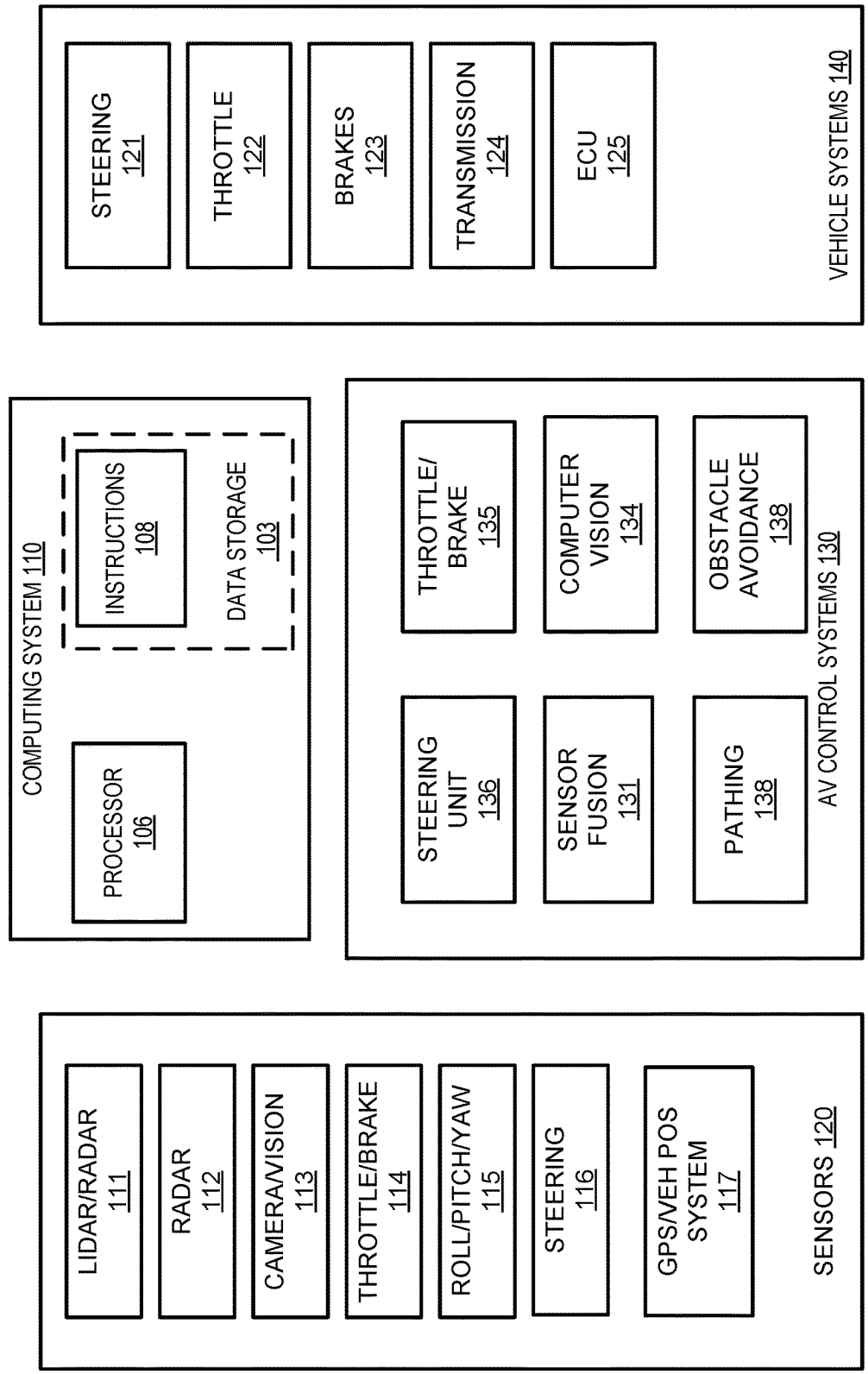
FIG. 1 illustrates an example autonomous or semi-autonomous vehicle with which embodiments of the disclosed technology may be implemented.

The figures are not exhaustive and do not limit the present disclosure to the precise form disclosed.

DETAILED DESCRIPTION

The ability to reconstruct a highly accurate 3D map of a scene, and to localize within the map precisely, is fundamental to ensuring robust autonomous navigation. By directly measuring the 3D geometry information of the scene, LiDAR sensors are more commonly used, making it easier to accomplish tasks such as mapping and localization. However, cameras are preferable over the expensive and bulky counterpart, because they are generally cheap and compact while providing richer semantic information about the environment. Embodiments may be configured to provide distinctive illumination and viewpoint invariant "learned" features (keypoints) for each frame in a monocular sequence. These keypoints can be then used for precise 3D localization and mapping. Traditional approaches extract hand-crafted 2D keypoints from a frame, and track and triangulate them over time between consecutive frames for localization and 3D recovery.

Embodiments can combine depth and keypoint learning in an end-to-end self-supervised learning framework, and learned features and descriptors can be used to obtain high-quality tracking over long time frames, achieving superior results compared to prior techniques.

Embodiments of the systems and methods disclosed herein can provide systems and methods for performing odometry for ego vehicle motion or other robotic motion without requiring empirical data in the form of a camera model. Embodiments may be implemented that take keypoints of multiple images in the form of two-dimensional (2D) pixels and project those 2D pixels into three-dimensional (3D) data. 3D correspondences across the images can be used to calculate displacement. A neural camera model can be used to perform keypoint projections without requiring knowledge of the camera model. Accordingly, embodiments can combine visual odometry using keypoints with a neural camera model to learn keypoints without knowing the camera model.

Accordingly, embodiments may be implemented to provide new systems and methods for neural network training that enable learning depth-aware keypoints for arbitrary camera configurations. This may provide an improvement over conventional solutions that require knowledge of camera parameters to lift 2D data points to 3D and project them to 2D.

In various embodiments, the neural camera model is configured to learn a pixel-wise ray surface that enables learning depth and pose estimates in a self-supervised way from a wider variety of camera geometries (e.g., pinhole, fisheye and catadioptric). Specifically, neural camera models may be configured to decouple camera intrinsic parameters from depth estimation, using a flexible neural network representation that produces pixel-wise ray surface vectors for 2D to 3D lifting. This can be used to improve the functioning of a self-supervised learning system in many ways. For example, the system may be configured to learn from various different camera geometries in the same way (from the standard pinhole to more distorted models such as fisheye and catadioptric) without knowing the camera parameters at the outset. As another example, embodiments may be implemented to combine the neural camera model with self-supervised keypoint learning to estimate accurate visual odometry for an uncalibrated camera system.

The systems and methods disclosed herein may be implemented with any of a number of different autonomous or semi-autonomous vehicles and vehicle types. For example, the systems and methods disclosed herein may be used with cars, trucks, buses, construction vehicles and other on- and off-road vehicles. These can include vehicles for transportation of people/personnel, materials or other items. In addition, the technology disclosed herein may also extend to other vehicle types as well. An example Autonomous Vehicle (AV) in which embodiments of the disclosed technology may be implemented is illustrated in FIG. 1.

FIG. 1 illustrates an example autonomous or semi-autonomous vehicle with which embodiments of the disclosed technology may be implemented. In this example, vehicle 100 includes a computing system 110, sensors 120, AV control systems, 130 and vehicle systems 140. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include lidar 111, radar 112, or other like the distance measurement sensors, image sensors 113, throttle and brake sensors 114, 3D accelerometers 115, steering sensors 116, and a GPS or other vehicle positioning system 117. One or more of the sensors 120 may gather data and send that data to the vehicle ECU or other processing unit. Sensors 120 (and other vehicle components) may be duplicated for redundancy.

Distance measuring sensors such as lidar 111, radar 112, IR sensors and other like sensors can be used to gather data to measure distances and closing rates to various external objects such as other vehicles, traffic signs, pedestrians, light poles and other objects. Image sensors 113 can include one or more cameras or other image sensors to capture images of the environment around the vehicle as well as internal to the vehicle. Information from image sensors 113 can be used to determine information about the environment surrounding the vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data or information from positioning system 117 to determine, refined or verify vehicle location.

Throttle and brake sensors 114 can be used to gather data regarding throttle and brake application by a human or autonomous operator. Accelerometers 115 may include a 3D accelerometer to measure roll, pitch and yaw of the vehicle. Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle by a human or autonomous operator. A steering sensor may include a position encoder monitor the angle of the steering input in degrees. Analog sensors may collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation and generally unusual at highway speeds. If the driver is turning the wheel at a fast rate while driving at highway speeds the vehicle computing system may interpret that as an indication that the vehicle is out of control. Steering sensor 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

Although not illustrated, other sensors 120 may be provided as well. Various sensors 120 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 include steering unit 136, throttle and brake control unit 135, sensor fusion module 131, computer vision module 134, pathing module 138, and obstacle avoidance module 139. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g, disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing module 138 may be included to compute a desired path for vehicle 100 based on input from various other sensors and systems. For example, pathing module 138 can use information from positioning system 117, sensor fusion module 131, computer vision module 134, obstacle avoidance module 139 (described below) and other systems to determine a safe path to navigate the vehicle along a segment of a desired route. Pathing module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing module 138 to determine an appropriate path to avoid a detected obstacle.

Vehicle systems 140 may include a plurality of different systems/subsystems to control operation of vehicle 100. In this example, AV control systems 130 include steering system 121, throttle system 122, brakes 123, transmission went 24, electronic control unit (ECU) 125 and propulsion system 126. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. This may also include an assist mode in which the vehicle takes over partial control or activates ADAS controls to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes.

Although one computing system 110 is illustrated in FIG. 1, in various embodiments multiple computing systems 110 can be included. Additionally, one or more systems and subsystems of vehicle 100 can include its own dedicated or shared computing system 110, or a variant thereof. Accordingly, although computing system 110 is illustrated as a discrete computing system, this is for ease of illustration only, and computing system 110 can be distributed among various vehicle systems or components.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding infrastructure elements, data regarding operation and intention of surrounding vehicles, and so on. A wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle or platforms.

FIG. 2 is a diagram illustrating an example system for performing generic visual odometry using learned features via neural camera models in accordance with various embodiments. This example includes an odometry circuit 210 and one or more cameras 232 mounted to a subject vehicle. Cameras 232 may include, for example, visible light cameras, infrared cameras, thermal cameras, ultrasound cameras, and other cameras configured to capture still or video images and producing an array of pixels or other image elements.

Odometry circuit 210 in this example includes a communication circuit 201, a decision circuit 203 (including a processor 206 and memory 208 in this example) and a power supply 212. Components of odometry circuit 210 are illustrated as communicating with each other via a data bus, although other communication in interfaces can be included.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to odometry circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a odometry circuit 210.

Communication circuit 201 either or both a wireless transceiver circuit 202 with an associated antenna 214 and a wired I/O interface 204 with an associated hardwired data port (not illustrated). As this example illustrates, communications with odometry circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by odometry circuit 210 to/from other entities such as one or more cameras 232 and other vehicle sensors and systems as may be appropriate.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

I. Neural Camera Model

In a self-supervised monocular structure-from-motion setting, a neural camera model may be configured to learn: (a) a depth model fd: I→D, that predicts a depth value d^=fd(I (p)) for every pixel p=[u, v]$^T$ in the target image I$_t$ (up to a scale factor); and (b) an ego-motion model f$_x$: (I$_t$, IC)→X$_{t→C}$, that predicts the rigid transformations for all c∈C given by X$_{t→c}$=($^{Rt}_{01}$)∈ SE(3), between the target image I$_t$ and a set of context images I$_c$∈I$_C$, taken as adjacent frames in a video sequence.

Embodiments may be configured to train depth and pose networks simultaneously in a self-supervised manner. This may be achieved by projecting pixels from a context image I$_c$ onto a target image I$_t$, and minimizing the photometric reprojection error between original target image, I$_t$ and synthesized Î$_t$ images.

Figure 3:
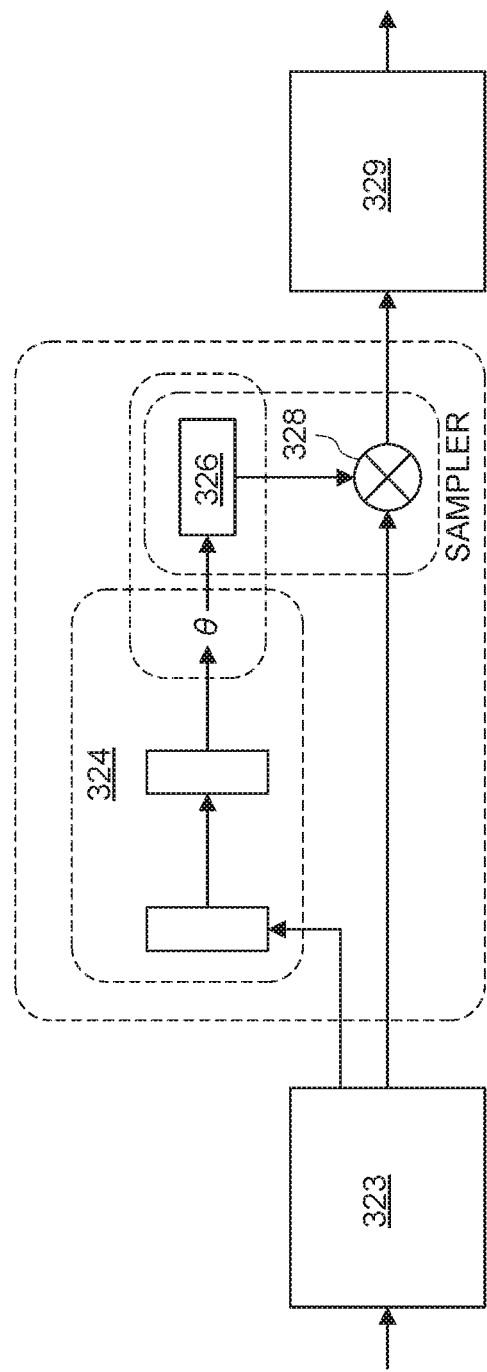
FIG. 3 illustrates an example architecture of a spatial transformer module in accordance with various embodiments.

The image synthesis operation in various embodiments may be performed using Spatial Transformer Networks (STNS) via grid sampling with bilinear interpolation, and may thus be fully differentiable. FIG. 3 illustrates an example architecture of a spatial transformer module in accordance with various embodiments. In this example, an input feature map 323 is provided to a localization network 324. Localization network 324 may be configured to regress the transformation parameters θ. The regular spatial grid may be transformed to a sampling grid 326. Sampling grid 326 may be applied to the input feature map via sampler 328 to produce warped output feature map 329. The combination of the localization network 324 and sampling mechanism (e.g., sampler 320) defines the example spatial transformer depicted in this embodiment.

In various embodiments, the pixel-wise warping may take the form of:

$$\hat{p}_t = \pi_c R_{t \to c} \phi_t(p_t, d_t) + t_{t \to c} \quad (1)$$

where φ(p, d)=P is responsible for 2D-to-3D conversion by lifting an image pixel in homogeneous coordinates p=[u, v, 1]$^T$ to a 3D point P=[x, y, z]$^T$ based on its depth value d. Conversely, π(P)=p projects a 3D point back onto the image plane as a pixel. For the standard pinhole camera model, used in many conventional learning-based monocular depth estimation algorithms, these functions have a closed-form solution and can be calculated as:

$$\phi(p \cdot d) = d\, K^{-1} p = d \begin{bmatrix} f_x & 0 & c_x \\ 0 & f_y & c_y \\ 0 & 0 & 1 \end{bmatrix}^{-1} [u\ v\ 1]_T \quad (2)$$

$$\pi(P) = \frac{1}{P_2} KP = \frac{1}{2} \begin{bmatrix} f_x & 0 & c_x \\ 0 & f_y & c_y \\ 0 & 0 & 1 \end{bmatrix}^{-1} [x\ y\ z]_T, \quad (3)$$

with intrinsics matrix K, focal length (f$_x$, f$_y$) and principal point (c$_x$, c$_y$). These parameters are usually assumed to be known, obtained using prior independent calibration techniques, or are learned as additional variables during the training stage.

The self-supervised objective loss to be minimized is of the form:

$$\mathcal{L}(I_t, \hat{I}_t) = \mathcal{L}_p(I_t, I_C) + \lambda_d \mathcal{L}_d(\hat{D}_t), \quad (4)$$

which is the combination of an appearance-based loss $\mathcal{L}_p$ and a weighted depth smoothness loss $\mathcal{L}_d$, described below in more detail. This loss is then averaged per pixel and batch during training to produce the final value to be minimized. For simplicity, embodiments may be implemented that do not explicitly model dynamic objects (which break the static scene assumption), although these could be easily incorporated into various embodiments framework to further improve experimental results.

A camera model may be defined by two operations: the lifting of 3D points from 2D image pixels, i.e., $\phi(p, d)=P$; and the projection of 3D points onto the image plane, i.e., $\pi(P)=p$. A standard pinhole perspective model provides closed-form solutions to these two operations, as matrix-vector products using the closed-form solution (Equations 2-3, above). Typical camera models include a ray surface that associates each pixel with a corresponding direction, offering a generic association between 3D points and image pixels. However, although lifting is simple and can be computed in closed form, the projection operation has no closed-form solution and is non-differentiable, which makes such models unsuitable for learning-based applications.

Figure 4:
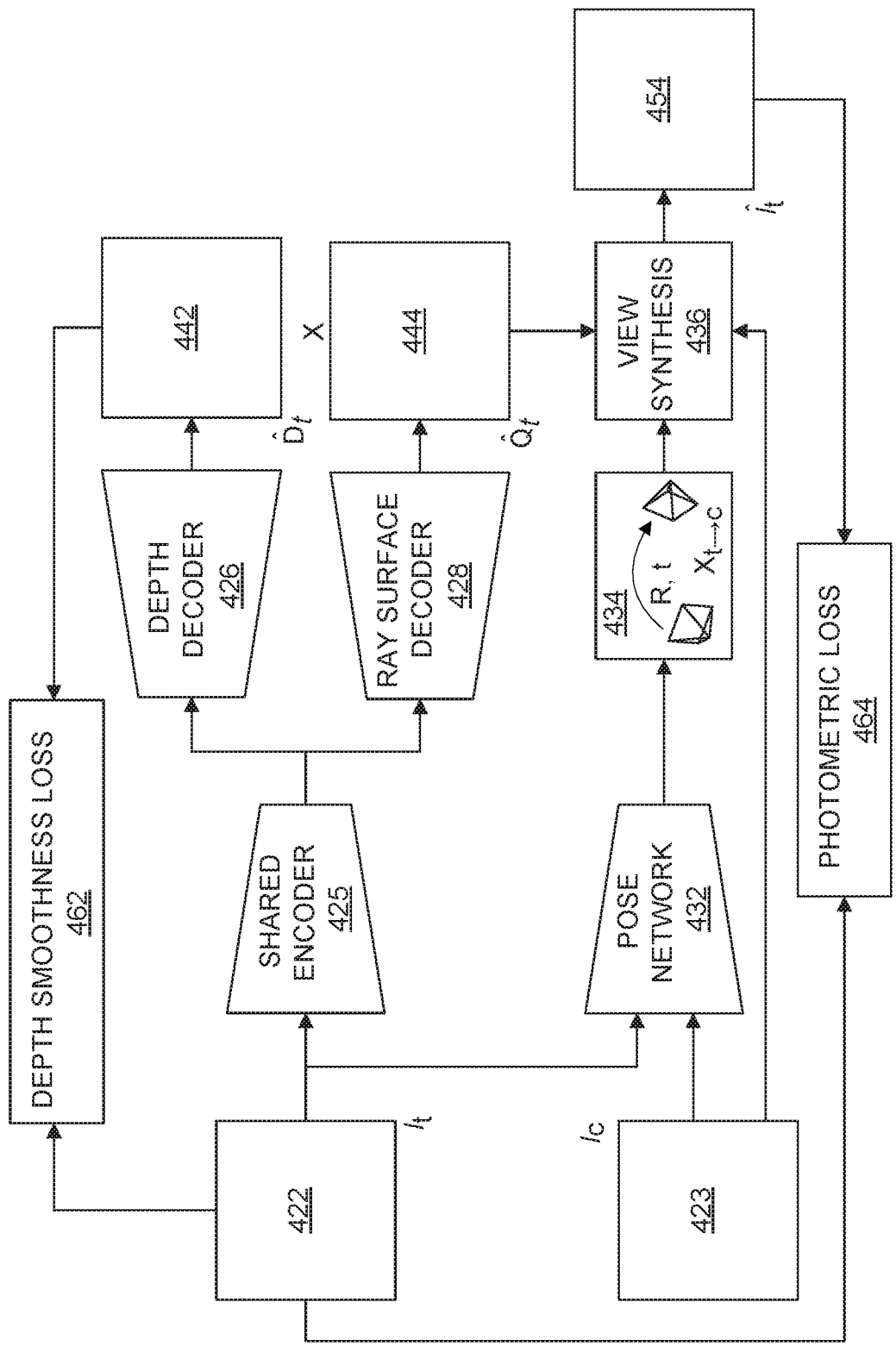
FIG. 4 illustrates an example of a training architecture in accordance with various embodiments.

Accordingly, embodiments may use a neural camera model that is differentiable, and thus amenable to end-to-end learning in a self-supervised monocular setting. FIG. 4 illustrates an example of a training architecture in accordance with various embodiments. This example provides a self-supervised monocular depth pose and ray surface estimation architecture in accordance with various embodiments. This example operates on multiple images, a target image 422 and a context image 423. Target image 422 is provided to a shared encoder 425.

In various embodiments, for each pixel $p=[u, v]^T$, a corresponding camera center $S(u, v)$ may be introduced as a 3D point and a unitary ray surface vector $Q(u, v) \in \mathbb{R}^3$, with $D(u, v)$ representing the scene depth along the ray. Note that, for central cameras, the camera center is the same for all points, so that $S(u, v)=S$, $\forall(u, v)$.

The shared encoder 425 may be configured to accept an image as input, and map it to a feature space that encodes both high-level image properties such as structure, as well as artefacts that may be due to the camera configuration, such as various distortions. These features are then "decoded" in depth decoder 426 and ray surface decoder 428 to yield the per pixel depth and per pixel ray surface.

Embodiments include a depth decoder 426, which may be implemented to provide a predicted depth map 442 for the target image. Embodiments may also include a ray surface decoder 428 that predicts a $\hat{Q}=f_r(I)$ to produce a predicted ray surface estimate 444 in the form of, $f_r$: $I \rightarrow Q$.

As shown in the example of FIG. 4, embodiments may be configured to train the depth and pose networks simultaneously in a self-supervised manner. Accordingly, target image 422 and context image 423 are provided to train a pose network 432. Training the depth and pose networks simultaneously in a self-supervised manner may be achieved by projecting pixels from the context image $I_c$ onto the target image $I_t$, and minimizing the photometric reprojection error between original $I_t$ and synthesized $\hat{I}_t$ images.

Embodiments may be implemented to accommodate appearance-based loss. the similarity between target It and warped $\hat{I}_t$ images may be estimated in some embodiments at the pixel level using Structural Similarity (SSIM) combined with an L1 loss term:

$$\mathcal{L}_p(I_t, \hat{I}_t) = \alpha \frac{1 - SSIM(I_t, \hat{I}_t)}{2} + (1-\alpha)\|I_t - \hat{I}_t\| \quad (5)$$

In order to increase robustness against parallax or the presence of dynamic objects, embodiments may be implemented to consider only the minimum pixel-wise photometric loss value for each context image In $I_C$. The intuition is that the same pixel will not be occluded or out-of-bounds in all context images, and its association with minimal photometric loss should be correct. Similarly, embodiments may mask out static pixels by removing those with a warped photometric loss $\mathcal{L}_p$ ($I_t$, $\hat{I}_t$) higher than their original photometric loss $\mathcal{L}_p$, ($I_t$, $I_c$).

Embodiments may compute a depth smoothness loss 462 operating on the predicted depth map 442 and the target image 422. To regularize the depth in textureless image regions, embodiments may incorporate an edge-aware term that penalizes high depth gradients in areas with low color gradients:

$$\mathcal{L}_s(\hat{D}_t) = |\delta_x \hat{D}_t| e^{-|\delta_x I_t|} + |\delta_y \hat{D}_t| e^{-|\delta_y I_t|}, \quad (6)$$

Given the above definitions, for any pixel p its corresponding 3D point P can be obtained as follows:

$$P(u, v) = S(u, v) + \hat{D}(u, v)\hat{Q}(u, v) \quad (7)$$

In other words, embodiments may scale the predicted ray vector $\hat{Q}(u, v)$ by the predicted depth $\hat{D}(u, v)$ and offset it by the camera center $S(u, v)$, which is the same for all pixels in a central camera. However, because embodiments may operate in a purely self-supervised monocular learning-based setting, the resulting depth and pose estimates are in some embodiments generated only up to a scale factor. This means that, for simplicity and without loss of generality, the system can assume that the camera center coincidences with the origin of the reference coordinate system and set $S(u, v)=[0, 0, 0]^T \forall u, v \in I$.

Consider $P_t=\{P_j\}Hj=1$ W, produced by lifting pixels from $I_t$ as 3D points. In the standard pinhole camera model, projection is a simple matrix-vector product (Equation 3). For embodiments of the neural camera model, however, for each 3D point $P_j$ the process identifies the corresponding pixel $p_i \in I_c$ with ray surface vector $\hat{Q}_i = \hat{Q}_c(p_i)$ that most closely matches the direction of Pj to the camera center $S_c$ (see FIG. 3b). Call this direction $r_c \rightarrow j = P_j - S_c$. Thus, the process finds $p^*_i$ such that:

$$p_i^* = \underset{p_i \in I_c}{\operatorname{argmax}}(\hat{Q}_c(p_i), r_{c \rightarrow j}) \quad (8)$$

Solving this problem may include searching over the entire ray surface $\hat{Q}_c$ and can be computationally expensive: a camera producing images of resolution H×W would require a total of $(HW)^2$ evaluations, as each 3D point from Pt can be associated with any pixel from the context image, $I_c$. Additionally, the argmax (the elements of the domain of the function at which the function values are maximized) operation is non-differentiable, which precludes its use in an end-to-end learning-based setting. Example solutions to each of these issues are presented below, which in conjunction enable the simultaneous learning of depth, pose and our proposed neural camera model in a fully self-supervised monocular setting.

To project the 3D points Pt onto context image $I_c$, embodiments may find for each $P_j \in Pt$ the corresponding pixel $pi \in I_c$ with surface ray $\hat{Q}i$ closest to the direction $rc,j=Pj-S_c$. Taking the dot product of each direction $_{rc \to j}$ with each ray vector $\hat{Q}i$, we obtain a $(H \times W)^2$ tensor M where each coefficient $Mij=(\hat{Q}i, _{rc \to j})$ =M(pi, Pj) represents the similarity between $\hat{Q}i$ and $_{rc \to j}$. With this notation, projection for a neural camera model may be given by selecting the i* index for each Pj with:

$$i^* = \underset{i}{\mathrm{argmax}} M(p_i, P_j) \quad (9)$$

To make this projection operation differentiable, embodiments may substitute argmax with a softmax with temperature $\tau$, thus obtaining a new tensor $M^-$ defined as:

$$\overline{M}(p_i, P_j) = \frac{\exp(M(p_i, P_j)/\tau)}{\left(\sum_i \exp(M(p_i, P_j)/\tau)\right)} \quad (10)$$

Softmax is a function that takes an vector of N real numbers, and normalizes it into a probability distribution of N probabilities proportional to the exponentials of the input numbers.

Embodiments may anneal the temperature over time so that the tensor becomes approximately one-hot for each pixel. The 2D-3D association used for projection may be obtained by multiplying with a vector of pixel indices. Thus, projection can now be implemented in a fully differentiable way using STNs.

Figure 5:
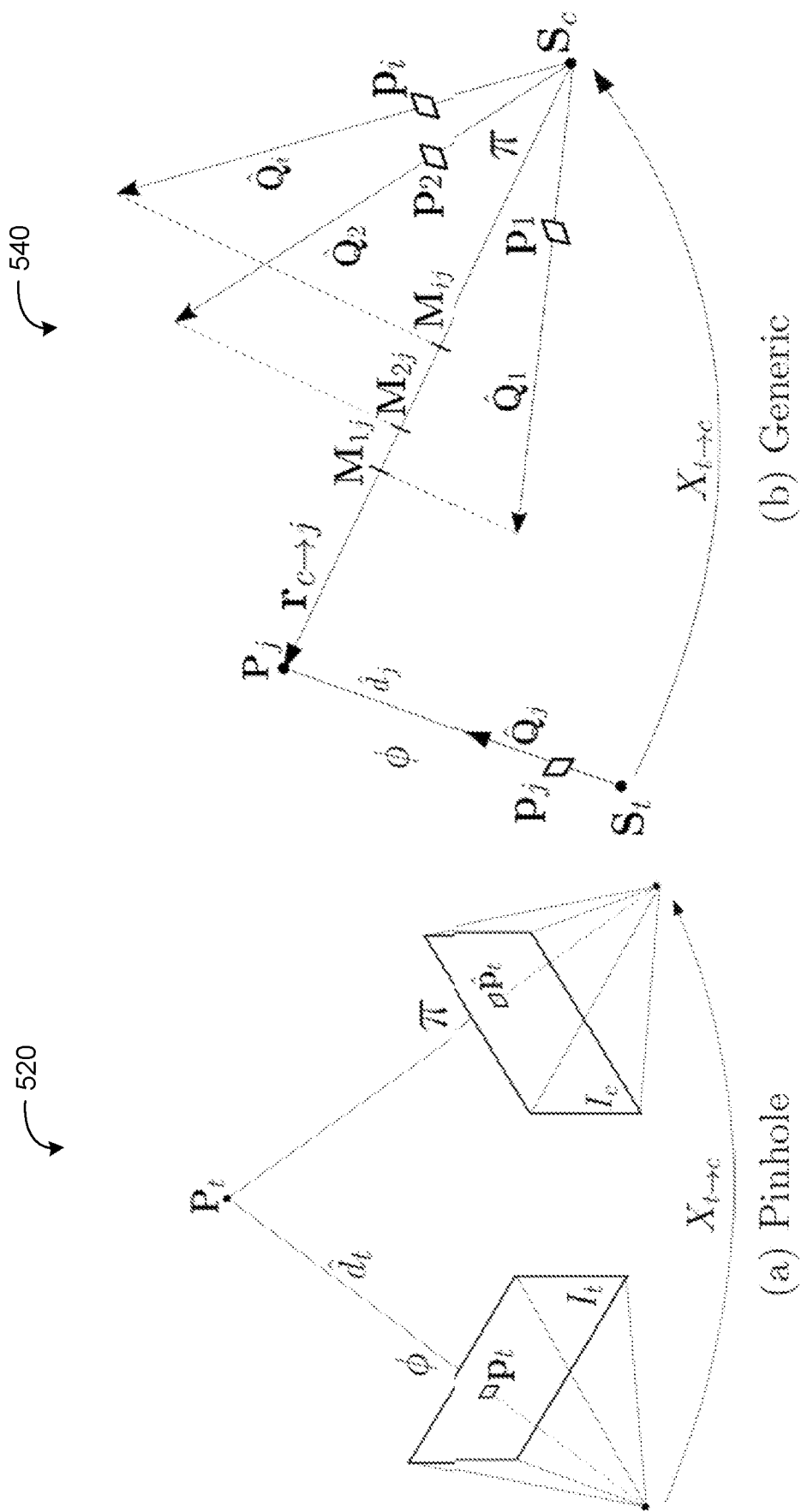
FIG. 5 is a diagram illustrating an example comparison of lifting and projection operations between the standard pinhole and various embodiments of the neural camera model.

FIG. 5 is a diagram illustrating an example comparison of lifting and projection operations between the standard pinhole and various embodiments of the neural camera model. The standard pinhole model is shown at 520 and shows the rigid transformation $Xt \to c$. The example at 540 shows embodiments of the neural camera model, for a single pixel $p_j$ considering target $I_t$ and context $I_c$ images. Straight arrows in the example at 540 represent unitary ray surface vectors Q(p), drawn out of scale to facilitate visualization. In this example, p1 is associated to pj, because it satisfies Equation 9.

In the structure-from-motion setting, learning a randomly initialized ray surface is similar to learning 3D scene flow, which is typically a challenging problem when no calibration is available, particularly when considering self-supervision. To avoid this random initialization, embodiments may be configured to learn instead a residual ray surface $\hat{Q}_r$, that is added to a fixed ray surface template $Q_0$ to produce $Q^{\hat{}}=Q_0+\lambda_r \hat{Q}_r$. The introduction of such template allows the injection of geometric priors into the learning framework, because if some form of camera calibration is known—even if only an approximation—the system can generate its corresponding ray surface, and use this as a starting point for further refinement using the learned ray surface residual.

If no such information is available, embodiments may be configured to initialize a "dummy" template based on a pinhole camera model, obtained by lifting a plane at a fixed distance (Equation 2) and normalizing its surface. For stability, embodiments may be configured to start training only with the template $Q_0$ and gradually introducing the residual $\hat{Q}_r$, by increasing the value of $\lambda_r$. Interestingly, this pinhole prior significantly improves training stability and convergence speed even in a decidedly non-pinhole setting (i.e., catadioptric cameras).

In a generalized version of the neural camera model, rays at each pixel are independent and can point in completely different directions. Because of that, Equation 9 requires searching over the entire image. This may quickly become computationally infeasible at training time even for lower resolution images, both in terms of speed and memory footprint. To alleviate such heavy requirements, embodiments may be configured to restrict the optimal projection search (Equation 10) to a small $h \times w$ grid in the context image $I_c$ surrounding the (u, v) coordinates of the target pixel $p_t$. The motivation is that, in most cases, camera motion will be small enough to produce correct associations within this neighborhood, especially when using the residual ray surface template described above. To further reduce memory requirements, the search may be performed on the predicted ray surface at half-resolution, which is then upsampled using bilinear interpolation to produce pixel-wise estimates. At test-time none of these approximations are necessary, and we can predict a full-resolution ray surface directly from the input image.

II. Keypoint Learning

Embodiments may be implemented to take advantage of the neural camera model in combination with fully self-supervised monocular depth-aware keypoint learning for the task of ego-motion estimation. Notably, various embodiments may perform depth-aware keypoint learning purely from observing large volumes of unlabeled videos, without any need for supervision in the form of ground-truth or pseudo ground-truth labels. As a consequence of learning the 2D-to-3D keypoint lifting function from monocular videos, this capability can be additionally used to accurately estimate the ego-motion between temporally adjacent images.

Figure 6:
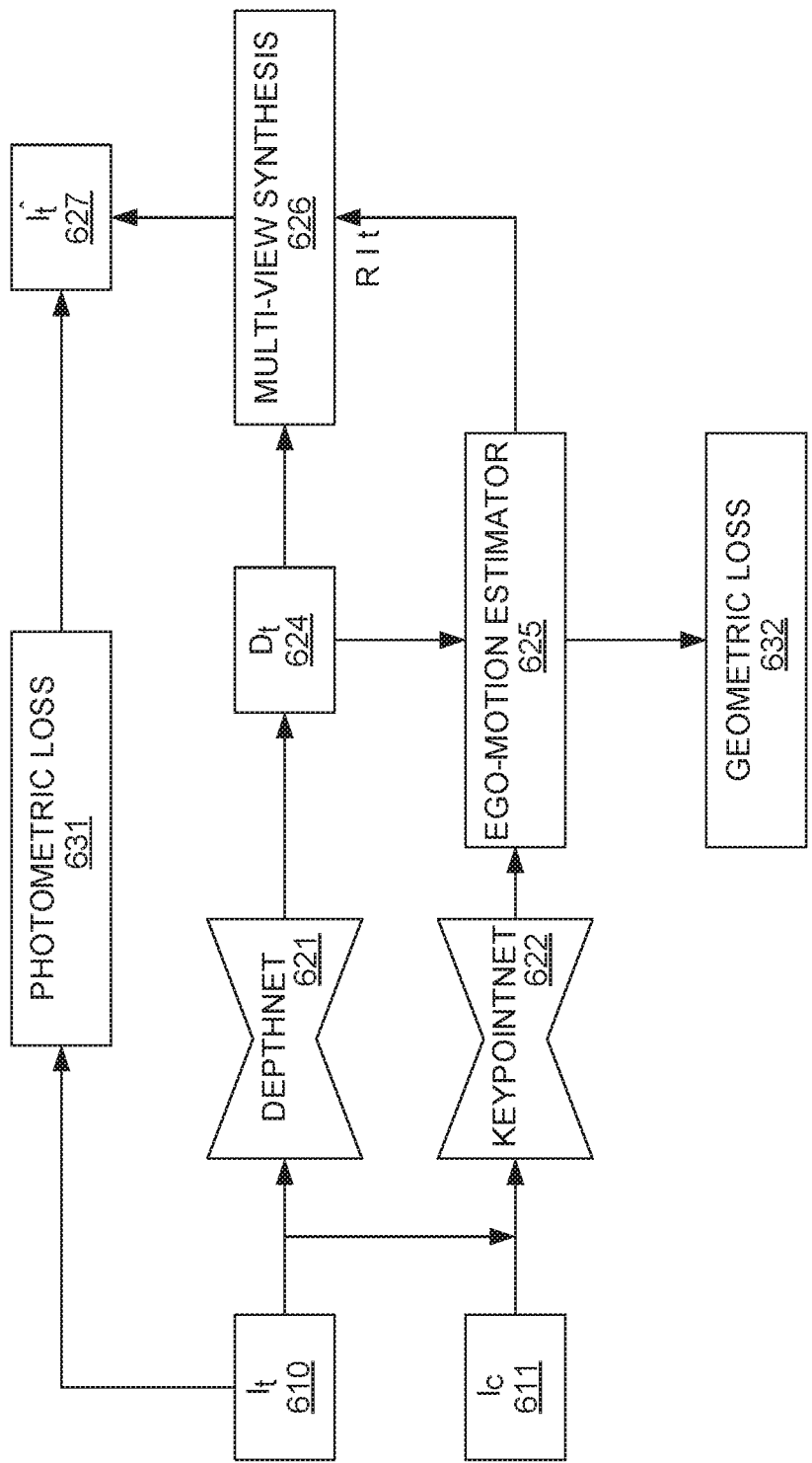
FIG. 6 illustrates an example of a monocular SfM-based keypoint learning architecture in accordance with various embodiments.

FIG. 6 illustrates an example of a monocular SfM-based keypoint learning architecture in accordance with various embodiments. The example architecture uses two consecutive images (target 610, $I_t$, and context 611, $I_c$) as inputs to selfsupervise 3D keypoint learning for monocular ego-motion estimation. The architecture trains the depth network 621 and Keypoint network 622 simultaneously in an end-to-end fashion. The depth network 621 is trained using target image 610, and keypoint network 622 is trained using a combination of target image 610 and context image 611. The predicted depth map 624 from depth network 621 is used with the output of keypoint network 622 to perform ego motion estimation at 625. This example uses a combination of photometric losses 631 and multiview geometric losses 632, to develop a 3D keypoint estimator for long-term ego-motion estimation.

For a given input monocular image I, embodiments may aim to regress keypoint locations, p, descriptors, f, and scores, s, along with dense depth map, D. Functionally, 3 components in this example may be used to enable depth-aware keypoint learning in an end-to-end differentiable setting: (i) KeypointNet fp: $I \to k$ (p, f, s) that learns to regress N output keypoint locations $p \in \mathbb{R}^{2 \times N}$, descriptors $f \in \mathbb{R}^{256 \times N}$ and scores $s \in \mathbb{R}^N$ given an input image $I \in \mathbb{R}^{3 \times H \times W}$; (ii) DepthNet fD: I→D, that learns to predict the scale-ambiguous dense depth map D=$f_D$(I), and as a result, provides a mechanism to lift the sparse 2D keypoints p∈ $\mathbb{R}^{2 \times N}$ to 3D by directly sampling from the predicted dense depth D, $p^d = \pi^{-1}(p, D_t(p_t))$; (iii) a fully-differentiable ego-motion estimator, $$f_x(I_c, I_t) = X_{t \to c} = \begin{pmatrix} R & t \\ 0 & 1 \end{pmatrix},$$

that predicts the relative 6-DoF rigid-body transformation between the target image $I_t$ and the context image $I_c$. $p^*_t$ is used to denote the warped keypoints $p_t$ from the target image $I_t$ to the context image $I_c$ via the transformation $x_{t \to c}$.

The depth may be computed at multiple scales during training, however, when referring to the associated sparse depth for a set of descriptors this document refers to the depth from the scale with the highest resolution. Notably in the monocular SfM setting, the depth scale is ambiguous up to an unknown scale factor.

Following the concept of leveraging known geometric transformations to self-supervise and boost keypoint learning, embodiments may use a self-supervised adaptation technique that leverages epipolar constraints in two-view camera geometry for robust 3D keypoint learning. This multi-view adaptation process, can include self-supervised 3D keypoint learning that leverages the structured geometry of scenes in unlabeled monocular videos.

In the adaptation step, embodiments compute the set of corresponding keypoints [$p_t^\phi$, $p_c^\phi$], i.e. $p_t$ from target image $I_t$ along with warped $P_{t \to c}^\phi$, in context image $I_c$, and use predicted keypoints $k_t$ and $k_c$ in the target and context images to compute $p_c^\phi$ via reciprocal matching in descriptor space. Given the set of corresponding keypoints [$p_t^\phi$, $p_c^\phi$] the system may compute the associated ego-motion, $x_{t \to c}$. Once ego-motion, $x_{t \to c}$ is known, the system may compute the warped key points, $p_{t \to c}^\phi$ by warping $p_t^\phi$ and may then induce a combination of dense photometric losses via image-synthesis and sparse geometric losses via re-projection in the monocular two-view setting.

Specifically, the system may be configured to use (i) a dense photometric loss based on the warped projection of $D_t$ in the context image $I_c$ aimed at optimizing the dense depth prediction by the depth network; and (ii) a sparse geometric loss aimed at minimizing the re-projection error between corresponding keypoints [$p_t^\phi$, $p_c^\phi$] predicted by the keypoint network.

Having computed keypoint correspondences [$p_t^\phi$, $p_c^\phi$], the system may utilize a robust estimator to compute the 6-degrees-of-freedom rigid-body pose transformation $x_{t \to c}$ between the target and context views.

By lifting the 2D keypoints from the target image to 3D with the associated depth $D_t$, the system may use the PnP algorithm to compute the initial relative pose transformation $x^0_{t \to c}$=(R0 0 t0 1) to geometrically match the keypoints in the target image to those in the context image $I_c$. Specifically, in the case of a pinhole camera the system may minimize:

$$E_\psi(X^0_{t \to c}) = \|p_c^\phi - \pi(X^0_{t \to c} \cdot P_t^\phi)\|_2.$$

Note that in various embodiments the neural camera model can be used to allow operation with arbitrary camera systems (without the need to know the camera model in advance) so that embodiments are not constrained to pinhole cameras.

The estimated relative pose $x^0_{t \to c}$ is obtained by minimizing the residual error in the above equation using a Gaussian-Newton (GN) method with RANSAC (random sample consensus) to ensure robustness to outliers. This step allows the system to compute the pose robustly, however, this makes the pose no longer differentiable with respect to the 3D keypoints used to estimate it. To alleviate this limitation, the system may address how the resulting pose estimate can be used as an initial-guess to an end-to-end differentiable pose estimation module within the proposed self-supervised 3D keypoint learning framework.

By calculating the re-projected context 3D keypoints $p_{t \to c}^\phi$ from the target keypoints $p_t^\phi$ via the initial pose estimate $x^0_{t \to c}$(R0 t0 t0 1), a 3D residual can be formulated to recover the pose in closed-form for the established inlier set in PnP:

$$E_{OP}(X_{t \to c}) = \|P_c - X_{t \to c} \cdot P_2\|_2,$$

where $$P_t = \pi^{-1}(p_t, D_t(p_t)), P_c = \pi^{-1}(p_c, d_c),$$

and $$d_c = [x^0_{t \to c} \cdot P_t]_z.$$

The 3D residual above can be effectively minimized by estimating the rotation and translation separately using a closed-form solution on the established inlier set. The system may first estimate the rotation by subtracting the means of the points and minimizing the r(R) by solving an SVD in closed-form (otherwise known as the Orthogonal Procrustes problem):

$$E(R) = \|P_c^* - R \cdot P_t^*\|_2, \text{ where } P_i^* = P_i - \overline{P}_i,$$

$$U\Sigma V = SVD\left(\sum (P_c^*)^T (P_t^*)\right), \text{ where } R = VU^T.$$

Once the rotation R is computed, the translation t can be directly recovered by minimizing:

$$t = P_c^* - R \cdot P_t^*.$$

Thus, the gradients for the pose rotation and translation can be effectively propagated with respect to the lifted 3D keypoint locations, making the overall pose estimation fully-differentiable. The differentiable pose estimated using the 2D keypoints from the context image and 3D keypoints from the target image tightly couples keypoint and depth estimation, thereby allowing both predictions to be further optimized using overall keypoint learning objective.

Embodiments may be configured to self-supervise the learning of depth-aware keypoints in a fully end-to-end differentiable manner using a combination of photometric and geometric losses (as computed at 631 and 632, respectively). And, as shown in the example of FIG. 6, the system may be configured to optimize both the keypoint network 622 and depth network 621 jointly using various losses, examples of which are now described.

Keypoint Loss. The total keypoint loss is composed of three terms:

$$\mathcal{L}_{kpn} = \mathcal{L}_{geom} + \beta_1 \mathcal{L}_{desc} + \beta_2 \mathcal{L}_{score}.$$

Using $X_{t \to c}$ and $P_t^\phi$, embodiments compute the warped keypoints from image $I_t$ to $I_c$ as:

$$p_{t \to c}^\phi = \pi(X_{t \to c} P_t^\phi) = \pi(R \cdot P_t^\phi + t)$$

At training time, embodiments may be implemented to reduce or minimize the distance between the set of warped keypoints $p_{t \to c}^\phi$ and the set of corresponding keypoints $p_c^\phi$ obtained via descriptor matching:

$$\mathcal{L}_{geom} = \|p_c^\phi - p_{t \to c}^\phi\|_2$$

Descriptor Loss. Embodiments may use nested hardest sample mining to self-supervise the keypoint descriptors between the two views. Given anchor descriptors $f_t$ from the target frame and their associated positive descriptors in the $f_+ = p_t^\phi$ in the context frame, we define the triplet loss:

$$\mathcal{L}_{desc} = \max(0, \|f, f_+\|_2 - \|f, f_-\|_2 + m),$$

where $f_-$ is the hardest descriptor sample mined from $f_s$ with margin m.

Score Loss. The score loss may be introduced to identify reliable and repeatable keypoints in the matching process. In particular, embodiments may be configured to ensure that (i) the feature-pairs have consistent scores across matching views; and (ii) the network learns to predict high scores for good keypoints with low geometric error and strong repeatability. This objective may be achieved by minimizing the squared distance between scores for each matched keypoint-pair, and minimizing or maximizing the average score of a matched keypoint-pair if the distance between the paired keypoints is greater or less than the average distance respectively:

$$\mathcal{L}_{score} = \left[ \frac{(s_t^\phi + s_c^\phi)}{2} \cdot (\|p_{t \to c}^\phi, p_c^\phi\|_2 - \bar{d}) + (s_t^\phi - s_c^\phi)^2 \right],$$

where $s_t^\phi$ and $s_c^\phi$ are the scores of the context and target frames respectively, and $d^-$ is the average re-projection error of associated points in the current frame, given by $$\bar{d} = \sum_i^L \frac{\|p_{t-c}^\phi\|^2 - (p_t^\phi)^2\|_2}{L}$$

Here, L denotes the total number of keypoint pairs and d refers to the 2D Euclidean distance in feature space between the L matching keypoints.

Photometric Loss. In addition to the geometric losses, the system may impose a dense photometric loss to learn dense depth in the DepthNet. Embodiments may be configured to warp the depth from the target from $D_t$ along via the predicted ego-motion estimate $x_{t \to c}$ to the context frame $I_c$, and impose a structural similarity (SSIM) loss between the synthesized target image $I_t$ and the original target image $I_t$.

The resulting dense photometric loss is regularized with an L1 pixel-wise loss term:

$$\mathcal{L}_{photo}(I_t, \hat{I}_t) = \gamma \frac{1 - SSIM(I_t, \hat{I}_t)}{2} + (1 - \gamma)|I_t - \hat{I}_t|.$$

In addition, the system may mask out static pixels by removing those which have a warped photometric loss $\mathcal{L}_{photo}(I_t, \hat{I}_t)$ higher than their corresponding unwarped photometric loss $\mathcal{L}_{photo}(I_t, \hat{I}_c)$, calculated using the original context image without view-synthesis. This has the effect of removing pixels with non-changing appearances, including static frames and dynamic objects with no relative motion.

Depth Smoothness Loss. To regularize the depth in texture-less low-image gradient regions, the system may also incorporate an edge-aware term:

$$\mathcal{L}_{sm} = |\delta_x \hat{D}_t| e^{|\delta_x I_t|} + |\delta_y \hat{D}_t| e^{-|\delta_x I_t|}. \quad (12)$$

Depth Consistency. As noted above, the depth regressed $D_t$ is scale-ambiguous. Scale-consistency may be important for tasks that involve accurate ego-motion estimation. To this end, the system incorporate a depth consistency term that discourages scale-drift between dense depth predictions in adjacent frames:

$$\mathcal{L}_{const} = \frac{\|D_t(p_t^\phi) - D_c(p_c^\phi)\|}{D_t(p_t^\phi) + D_c(p_c^\phi)}$$

Note that $\mathcal{L}_{const}$ is a sparse loss defined based on the correspondences $[p_t^\phi, p_c^\phi]$.

Overall Objective. The overall objective used to simultaneously optimize the KeypointNet and DepthNet becomes:

$$\mathcal{L}_{depth} + \alpha \mathcal{L}_{kpn}$$

where $\beta 1$, $\beta 2$, $\beta 3$, $\beta 4$, $\alpha$ and $\gamma$ are weights used to balance the depth and keypoint losses and they are chosen as $\alpha=0.1$, $\beta 1=\beta 2=1.0$, $\beta 3=\beta 4=0.1$, and $\gamma=0.85$, respectively during the training.

As noted above, the total keypoint loss is $$\mathcal{L}_{kpn} = \mathcal{L}_{geom} + \beta_1 \mathcal{L}_{desc} + \beta_2 \mathcal{L}_{score},$$

and the depth loss is:

$$\mathcal{L}_{depth} = \mathcal{L}_{photo} + \beta_3 \mathcal{L}_{smooth} + \beta_4 \mathcal{L}_{const}.$$

III. Visual Odometry

Embodiments may be configured to use the neural camera model (e.g. as described above) to model arbitrary or unknown camera systems and combine that with keypoint framework (e.g., also as described above). The neural camera model can be used so that the keypoint process can be carried out without having known camera parameters to lift pixels from 2D to 3D and project them back to a two-dimensional image.

Accordingly, embodiments may use self-supervised learning for training without needing labels from captured images. Embodiments enable learning from a wide variety of camera models, including variations in the same camera geometry and also different camera geometries.

Embodiments may be implemented that combine, and estimate keypoints, descriptors and scores using the keypoint network 622, and depth and ray surface in the depth network 621. The system may be configured to use the descriptors to estimate correspondences between pairs of images as, for example, described above with regard to self-supervise 3D keypoint learning. Based on the keypoint correspondences, the system may lift one set of keypoints to 3D, using the learned neural camera model. This allows the system to circumvent the requirement of knowing the exact camera model, including intrinsic parameters and distortion.

The system may then estimate the transformation T between the two images using the 3D-2D correspondences (i.e. one set of lifted keypoints and the corresponding set of 2D keypoints). Once the transformation T has been computed, the system may then project the 3D keypoints into the second image. The system may use the learned neural camera model for this projection.

Similarly, at test time the system may estimate the transformation between two images using 3D-2D keypoint matching. The lifting to 3D and projection to 2D may be achieved through the neural camera model, thereby overcoming limitations imposed by unknown or poorly calibrated cameras as well to extend techniques for visual odometry estimation to any type of camera.

Figure 7:
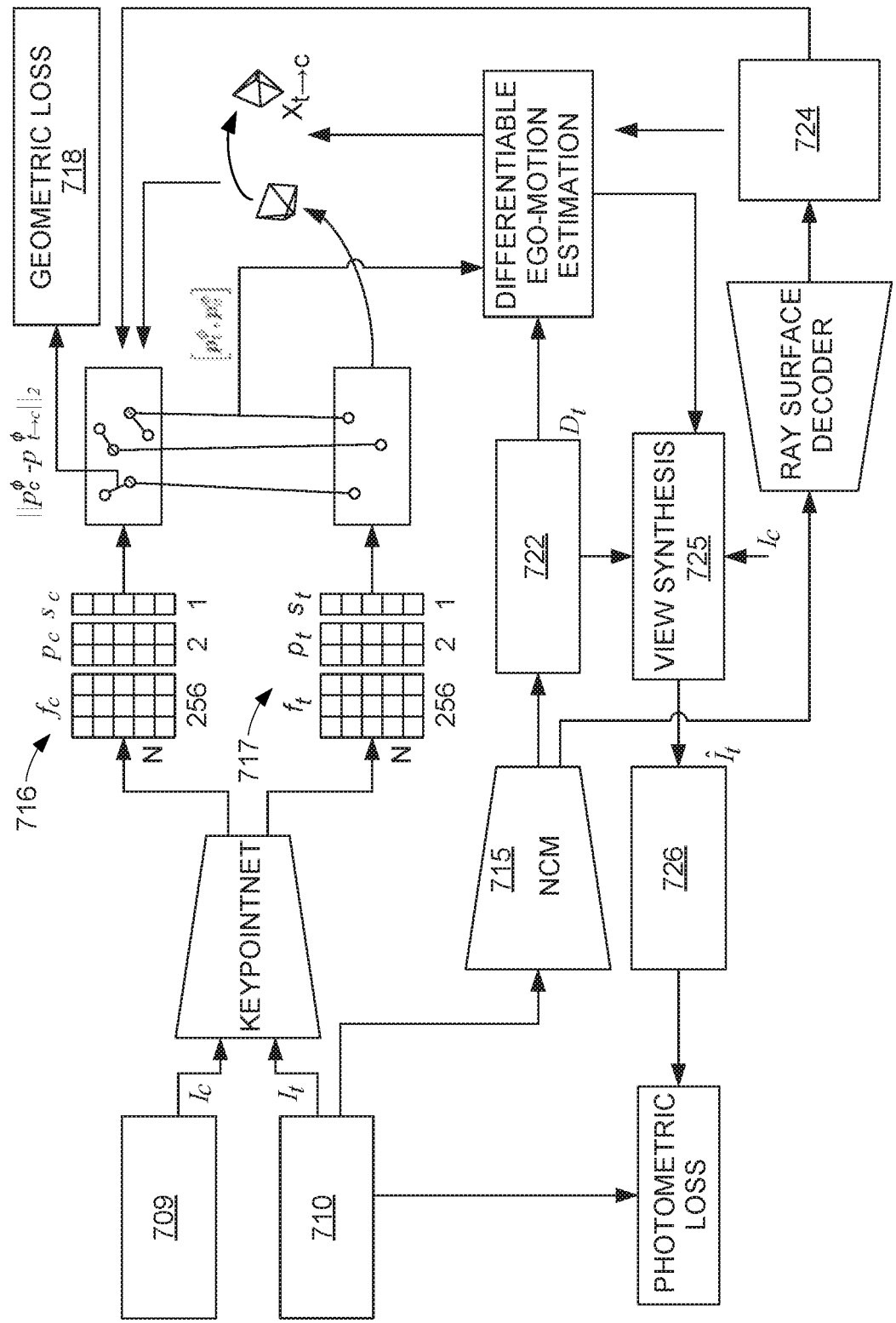
FIG. 7 is a diagram illustrating an example architecture for using a neural camera model to learn lifting and projection of the keypoint network from image data.
Figure 8:
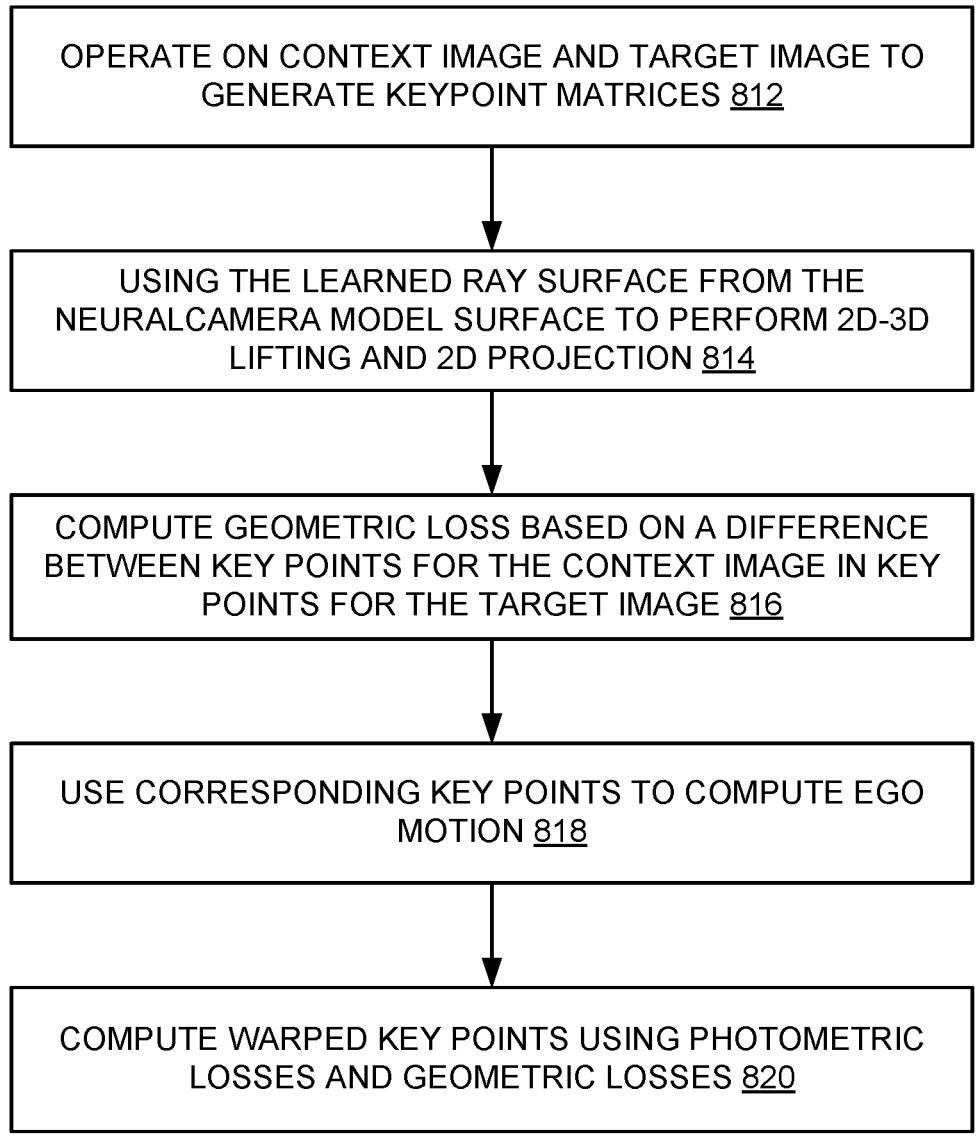
FIG. 8 is a diagram illustrating an example process for using a neural camera model to learn lifting and projection of the keypoint network from image data.

FIG. 7 is a diagram illustrating an example architecture for using a neural camera model to learn lifting and projection of the keypoint network from image data. FIG. 8 is a diagram illustrating an example process for using a neural camera model to learn lifting and projection of the keypoint network from image data. Referring now to FIG. 7 and FIG. 8, in the illustrated example, a context image 709 in a target image 710 are used for the training. A keypoint network 714 (e.g., as illustrated in FIG. 6) and a neural camera model 715 (e.g., as illustrated in FIG. 4) are utilized.

In embodiments, the system uses neural camera model 715 to learn lifting and projection of the keypoint network based on image data. Particularly, in this example neural camera model 715 uses data from target image 710. In some embodiments, neural camera model uses depth decoding to predict a depth map 722 and a ray surface decoder to predict the ray surface 724.

At operation 812, keypoint network 714 operates on context image 709 and target image 710 to generate the keypoint matrix 716 for the context image and keypoint matrix 717 for the target image. Each matrix 716, 717, includes descriptors, key points and scores for their respective images. These may be described as ($f_c$, $P_c$, $S_c$) in the case of context image 709, and ($f_t$, $P_t$, $S_t$) in the case of target image 710. In various embodiments, the system computes a set of corresponding keypoints [$p_t^\Phi$, $p_c^\Phi$](i.e., $p_t^\Phi$ from target image 710 along with $p_t^\Phi$ in the context image $I_c$).

At operation 814, the system performs the 2D to 3D lifting and 2D projection using the predicted ray surface 724 from the neural camera model 715.

At operation 816, the system computes the geometric loss based on the difference between key points for context image 709 and keypoint for target image 710.

At operation 818, the system uses predicted keypoints $k_t$ and $k_c$ in the target and context images to compute $p_c^\Phi$ via reciprocal matching in descriptor space. Given the set of corresponding keypoints [$p_t^\Phi$, $p_c^\Phi$] the system may compute the associated ego-motion $x_{t \to c}$. In this example, the system takes advantage of the learned depth map 722 and learned ray surface 724 provided by the neural camera model 715 for computing ego motion estimation.

At operation 820, once the ego motion, $x_{t \to c}$, is known, the system may compute the warped key points $p_c^\Phi$ by warping $p_t^\Phi$ and induce a combination of dense photometric losses via image-synthesis 725 and sparse geometric losses 718 via re-projection in the monocular two-view setting.

In the illustrated example, learned depth map 722 and learned ray surface 724 can be combined and used along with context image 709 and an estimate of differentiable ego motion to perform a view synthesis 725. In various embodiments, the synthesis 725 can be performed as described above with reference to FIG. 3. This can be used to create a warped synthesized image 726.

Embodiments above describe using the neural camera model to learn camera parameters into use a learned ray surface for 3D lifting and 2D projection. Further embodiments can start with a rough estimate of camera parameters (as opposed to no information at all) and refine or improve these parameters by learning over time.

Figure 9:
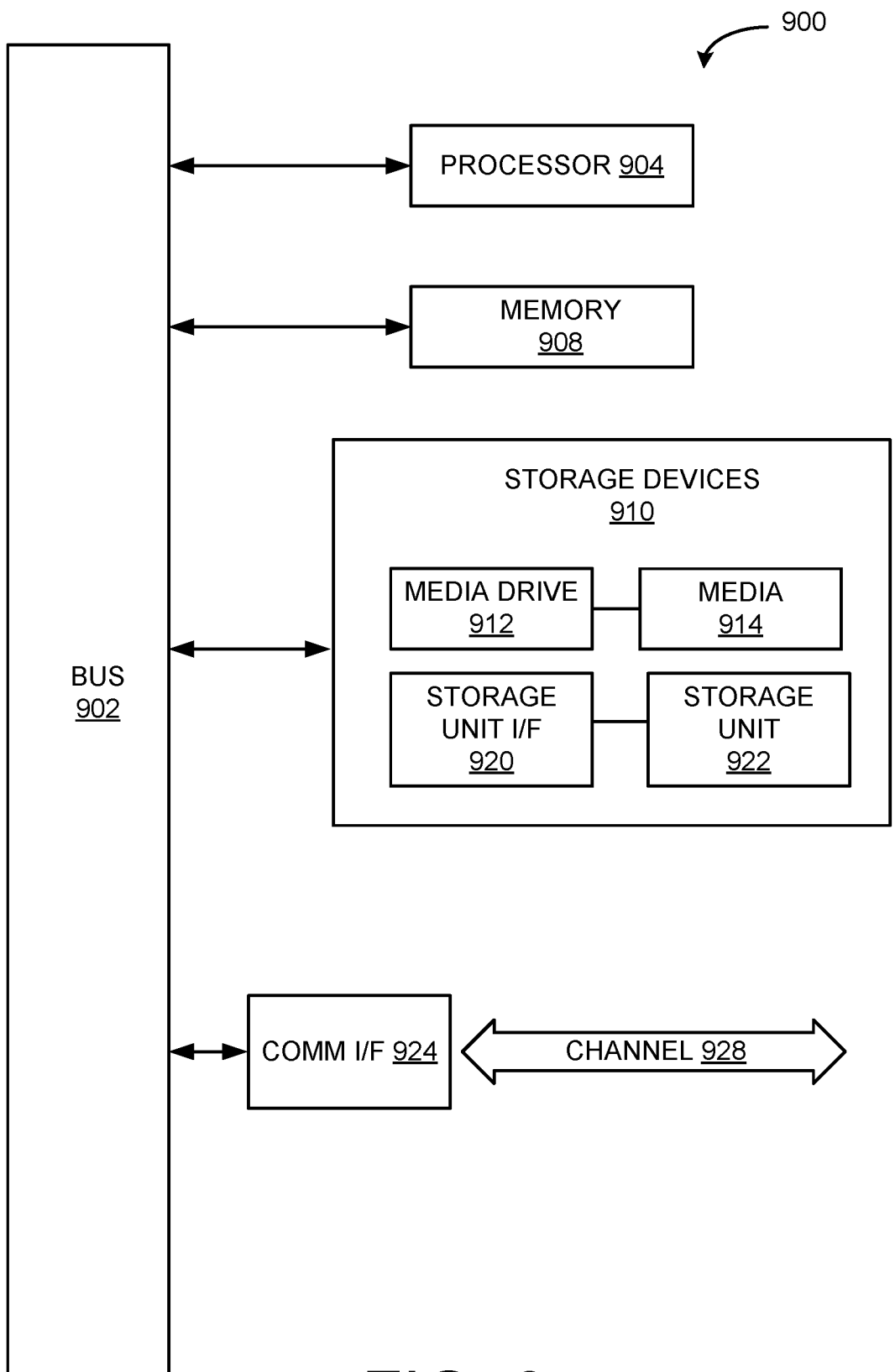
FIG. 9 is an example computing component that may be used to implement various features of embodiments described in the present disclosure.

As used herein, the term module may be used describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. Various components described herein may be implemented as discrete module or described functions and features can be shared in part or in total among one or more modules. In other words, as would be apparent to one of ordinary skill in the art after reading this description, the various features and functionality described herein may be implemented in any given application. They can be implemented in one or more separate or shared modules in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where modules are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
 estimating correspondences between keypoints of a target camera image and keypoints of a context camera image, wherein the target camera image and the context camera image are obtained from a monocular sequence;
 using a ray surface decoder to predict a ray surface from the target image, wherein the predicted ray surface associates a respective pixel in the target image with a corresponding direction;
 based on the keypoint correspondences and the predicted ray surface, lifting a set of 2D keypoints to 3D, using a neural camera model; and
 projecting the 3D keypoints into the context camera image using the neural camera model.

2. The method of claim 1, wherein lifting to 3D and projection to 2D achieved through the neural camera model are performed without a known or calibrated camera model.

3. The method of claim 1, wherein the neural camera model is configured to learn a pixel-wise ray surface that enables learning depth and pose estimates in a self-supervised way from a wider variety of camera geometries.

4. The method of claim 1, further comprising using a key point network to learn a keypoint matrix for the target camera image and the context camera image, wherein estimating the correspondences between the keypoints of the target camera image and the keypoints of the context camera image comprises using learned descriptors from the keypoint matrix to estimate the correspondences between the keypoints of the target camera image and the keypoints of the context camera image.

5. The method of claim 4, wherein using the learned descriptors to estimate the correspondences between the target camera image and the context camera image comprises computing a set of corresponding keypoints comprising a keypoint from the target image and a warped corresponding keypoint in the context image.

6. The method of claim 4, wherein using the learned descriptors to estimate the correspondences between the target image and the context image comprises self-supervised 3D keypoint learning.

7. The method of claim 1, wherein using the ray surface decoder to predict the ray surface from the target image comprises learning a residual ray surface and adding the residual ray surface to a fixed ray surface to produce the predicted ray surface.

\* \* \* \* \*